United States Patent [19]
Brooks

[11] 3,747,766
[45] July 24, 1973

[54] CONTINUOUS FILTER SYSTEM FOR WASTE USING ROLL FILTER PAPER OR OTHER SELF-CLEANING FILTER

[75] Inventor: Frederick J. Brooks, San Rafael, Calif.

[73] Assignee: Astrotronics Research Ltd., British Columbia, Canada

[22] Filed: Dec. 28, 1970

[21] Appl. No.: 101,858

Related U.S. Application Data
[63] Continuation-in-part of Ser. No. 832,052, June 11, 1969, Pat. No. 3,630,377.

[52] U.S. Cl.................. 210/259, 210/300, 210/304
[51] Int. Cl............................................ B01d 35/00
[58] Field of Search ................ 210/63, 64, 73, 152, 210/259, 300, 387, 304

[56] References Cited
UNITED STATES PATENTS

| | | | |
|---|---|---|---|
| 2,736,434 | 2/1956 | Yacoe | 210/387 X |
| 3,399,778 | 9/1968 | O'Neill | 210/387 |
| 3,558,482 | 1/1971 | Young | 210/73 |
| 3,559,807 | 2/1971 | Reilly | 210/152 |
| 3,630,365 | 12/1971 | Woodbridge et al. | 210/259 X |

Primary Examiner—Samih N. Zaharna
Assistant Examiner—Richard W. Burks
Attorney—Julian Caplan

[57] ABSTRACT

Household and other waste consisting of liquid and solids conveyed by water is discharged into the system through the inlet pipe. Filter paper from a roll is fed around the inlet pipe and formed into a tube, which continues beyond the end of the inlet pipe and encapsulates all the waste. The end of the inlet pipe and the extending paper tube are enclosed in a perforated or porous pipe which prevents the tube from opening. A screw in the last half of the porous pipe twists the paper into nodules enclosing solid waste while the liquid waste is squeezed and filtered through the paper and the perforated pipe. A dehydrator fed by the screw decomposes the filter paper and solid waste matter contained therein.

10 Claims, 7 Drawing Figures

INVENTOR.
FRED J. BROOKS
BY
Julian Caplan
ATTORNEY

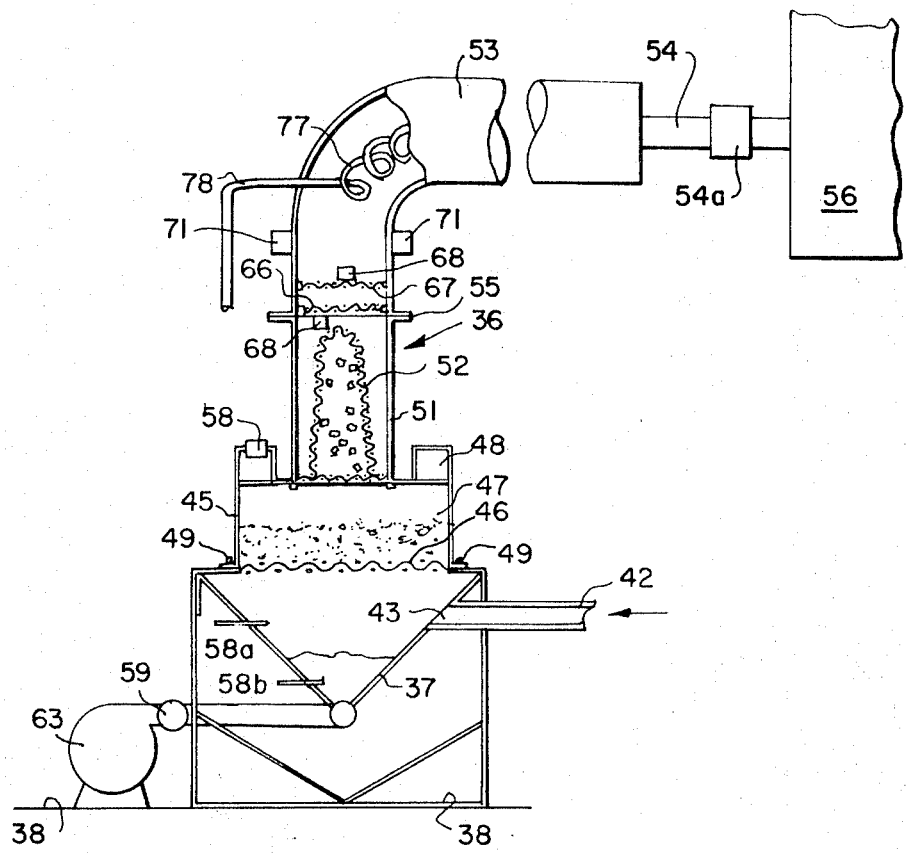
FIG. 3.
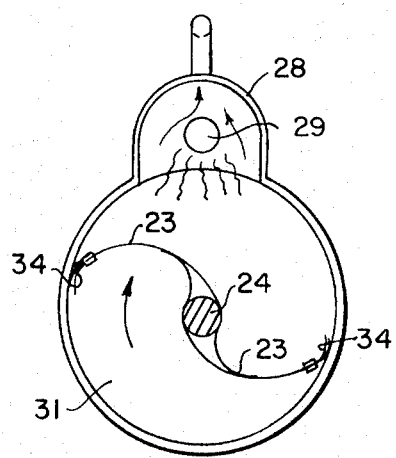
FIG. 4.
FIG. 5.
INVENTOR.
FRED J. BROOKS
BY
Julian Caplan
ATTORNEY

PATENTED JUL 24 1973 3,747,766

INVENTOR.
FRED J. BROOKS
BY Julian Caplan
ATTORNEY 3,747,766

CONTINUOUS FILTER SYSTEM FOR WASTE USING ROLL FILTER PAPER OR OTHER SELF-CLEANING FILTER

This invention is a continuation in part of co-pending application Ser. No. 832,052, filed June 11, 1969, for "Sewage Filter Unit" now U.S. Pat. No. 3630377, patented Dec. 28, 1971.

This invention relates to a new and improved self-cleaning filter for waste and further comprises a continuous filter system for waste using roll filter paper. The apparatus hereinafter described are intended to filter and dispose of the waste originating in a single or multiple dwelling or in light industrial or commercial installations.

A principle distinguishing feature of the present invention is the fact that the waste is discharged into the system in such manner that is is received in a tube of filter paper, which tube is formed from a roll of such paper. Liquid material passes through the paper and the solid matter is encapsulated in the paper. The paper is then compressed into nodules, preferably by a twisting action, thus forming links similar to a sausage, to help convey and further squeeze out water and then the solid matter and the paper which encapsulates the same is dehydrated or burned in an incinerator.

Another feature of the invention is the fact that all of the waste, both solid and liquid, is effectively disposed of without contamination of the atmosphere, land or streams.

Thus a distinguishing feature of the present invention is that it is a completely closed system and no tanks or ponds of the type required for bacterial treatment of sewage are required. Further, objectionable odors and effluent which are characteristic of conventional sewage treatment facilities are not present. In the present invention materials producing such results are removed. The fact that the unit which is the subject of this invention is compact and free from objectionable odors and discharges makes it possible to locate the unit adjacent to and in residential and commercial property.

Another advantage is the fact that the system is sealed from the atmosphere. Hence objectionable fumes are not released and the device may be installed near inhabited locations.

Still another advantage of the invention is that operation of the device is practically automatic and with very few exceptions no attention of an operator is required. Thus occasionally a new roll of paper may be spliced onto an exhausted roll and the ash resulting from dehydration must be removed. In other respects the apparatus works automatically. Maintenance requirements are minimal.

Other objects of the present invention will become apparent upon reading the following specification and referring to the accompanying drawings in which similar characters of reference represent corresponding parts in each of the several views.

In the drawings:

FIG. 3 is a vertical sectional view through a secondary filter of the present invention.

FIG. 4 is an enlarged sectional view taken substantially along line 4—4 of FIG. 1.

FIG. 5 is an enlarged sectional view of a plug containing radioactive substance.

Figure 1:
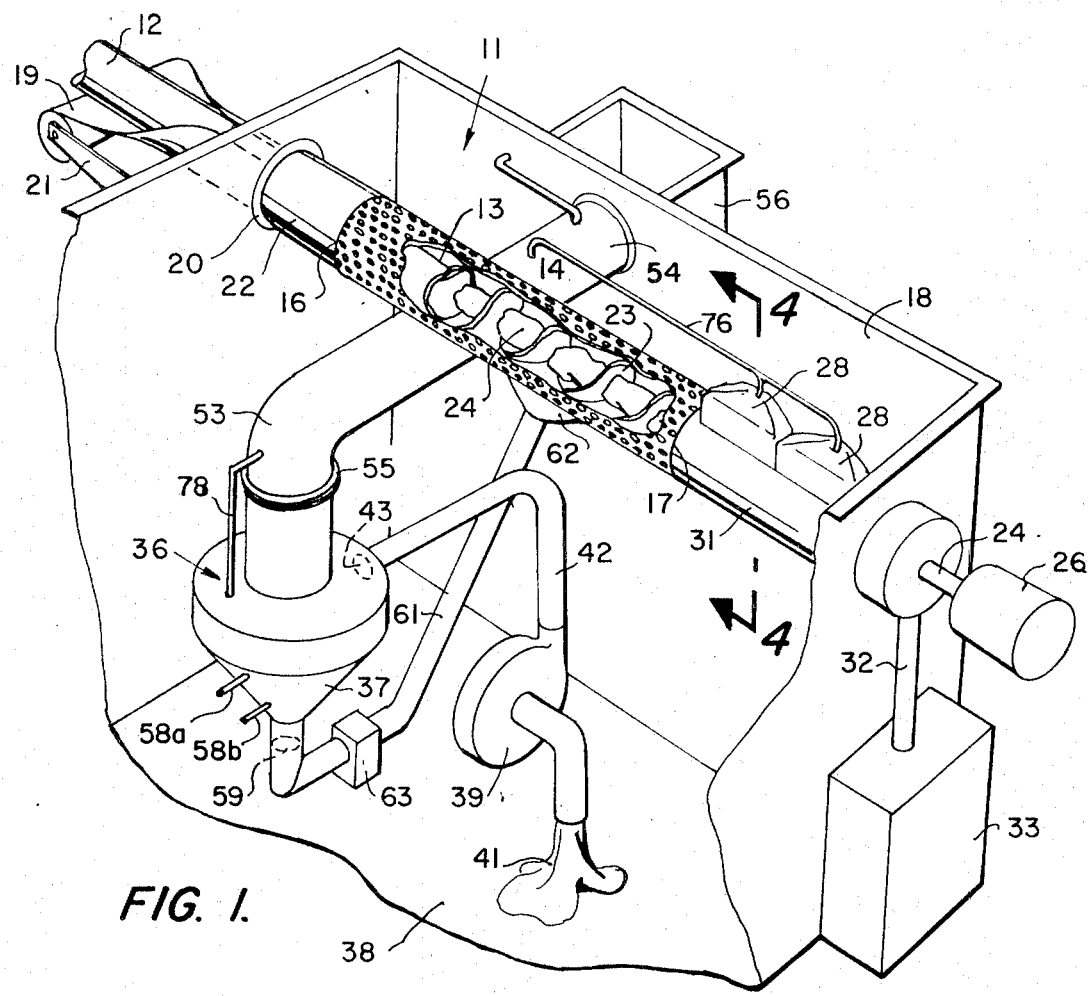
FIG. 1 is a schematic perspective view, partly broken away in section, showing the system of the present invention.
Figure 2:
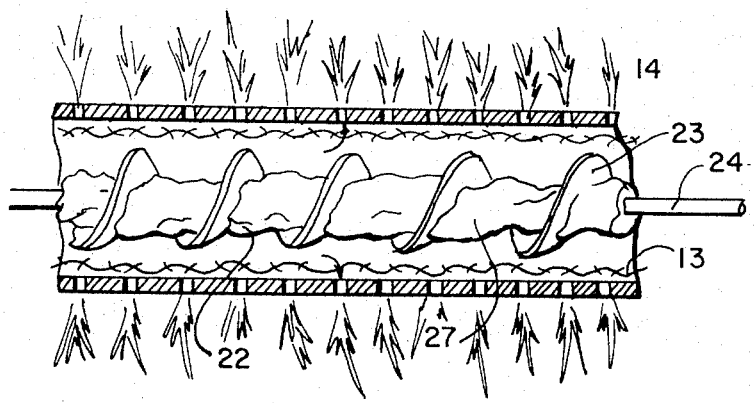
FIG. 2 is an enlarged, fragmentary sectional view taken substantially along the line 2—2 of FIG. 1.

Primary filter 11 encapsulates solid waste matter in a tube of paper similar to filter paper, discharging the liquid through the filter paper and retaining and twisting the solid material inside the paper tube. The paper and contents are then dehydrated or burned while the liquid may be further purified in secondary filter 36.

The primary filter receives the waste from an inflow pipe 12 and is preferably intermittently actuated by switch means (not shown) associated with the accumulation of waste. Pipe 12 terminates at terminus 13. The end of pipe 12, adjacent to terminus 13, is enclosed in a perforated pipe 14 which extends beyond terminus 13. Thus the origin 16 of pipe 14 overlaps terminus 13 while the terminus 17 of pipe 14 is displaced considerably beyond terminus 13.

Pipe 12 extends from the exterior into a casing 18 in which pipe 14 is located. A roll of filter paper 19 is held in support 21 externally of casing 18 so that the roll may be replaced from time to time as required. By screw means hereinafter described, the paper is fed from roll 19 to the right as viewed in FIG. 1, forming a tube 22 around the exterior of pipe 12 and inside pipe 14. A water tight gasket 20 surrounding tube 22 prevents leakage from casing 18. Gasket 20 is preferably of a soft plastic foam. Thus the solid waste from pipe 12 is received within the tube 22, and since the paper of which the tube is formed is porous and of the nature of filter paper, the liquid may pass through the paper and also through the perforations in pipe 14 falling into the bottom of the casing 18, while the solid material is enclosed within the tube 22.

Disposed within pipe 14 is a helical screw 23 having a central drive shaft 24. Screw 23 functions to advance the paper from the roll 19 into the tube 22 and also, as it is turned by motor 26, twists the tube 22 into nodules between the flights of the screw similar to sausage links. Motor 26 may be actuated intermittently as waste is discharged through pipe 12, thereby conserving paper. The twisting action of screw 23 further compresses the waste material and expresses liquid through the filter and out through the pipe 14.

Beyond the end 17 of pipe 14 is a dehydrator unit 31 which drives off moisture and then preferably dehydrates the paper and the waste contained therein. Unit 31 may contain high temperature lamps 29, arcs or gas-fired or electrical-heated high temperature sources which dehydrate or burn thhe waste material without creating obnoxious odors due to condensing of all steam and gases back in the liquid. The ash or carbon is discharged through duct 32 into a bin 33 where it may be removed periodically. Wire brushes 34 on the last turns of screw 23 convey the ash to the right and into duct 32. The entire system of pipes 12, 14 and 31 slants down to the right as viewed in FIG. 1. Heating of waste material generates steam and other vapors which collect in dome 28. Such vapors are condensed as hereinafter described.

Preferably, a secondary filter 36 treats the liquid which is discharged through pipe 14. Thus, a conical hopper 37 is disposed above pit 38 at the bottom of casing 18. Pump 39 pumps the liquid which falls into pit 38 from pipe 14 from the intake 41 at the bottom of the pit through conduit 42 into the inlet 43 at the top of hopper 37.

Directing attention to FIG. 3, the top of hopper 37 is provided with a filter screen 46 and above the screen 46 is casing 45 holding bed 47 of aggregate having components which remove detergent scum and also activated alumina or other chemicals which break down detergents. A bin 48, here shown as annular, replenishes aggregate dumped from bed 47 as it is filled with filtrate. Bin 48 may be replenished through hatch 50. Screen 46 and aggregate 47 filter out additional solid components of the liquid which have not been trapped in the paper in the primary filter 11. Various means may be employed to clean screen 46 and aggregate 47 as set forth in application Ser. No. 832,052. The solid matter which is not accepted by screen 46 or which is cleaned from screen 46 and aggregate 47 drops to the bottom of hopper 37 for further disposal as hereinafter set forth. For rapid easy removal, studs and wing nuts 49 hold casing 45 and bin 49 in place on hopper 37 and casing 45, respectively.

Extending above aggregate bed 47 is a filter casing 51 and disposed within the casing 51 is a conical filter screen 52 holding activated charcoal or other filter medium. It will be understood, as set forth in said application, Ser. No. 832,052, that more than one filter screen 52 may be positioned in casing 51, depending upon the requirements of the system.

At the top of casing 51 the liquid is substantially free of solid components but may contain bacteria. Flanges 55 join the top of casing 51 to curved bacteria-killing chamber 53 where bacteria may be destroyed by chemical, ultrasonic radiation or other means. Chamber 53 may contain some or all of the following bacteria-killing means or other mechanical, chemical or radiation means. Thus screens 66 of a very fine mesh held in frames 67 inside pipe 53 may be vibrated by ultrasonic vibrators 69 glued or welded thereto. The high frequency vibrations destroy bacteria present. Hollow plugs 71 containing radio-active material 72 may be threaded into chamber 53. Such plugs have external shields 73 and internal windows 74 so that the interior of chamber 53 is thoroughly subjected to gamma radiation. Ultraviolet and other radiant energy sources may be installed.

The screens 66 may be vibrated at two or more different frequencies, the differing frequencies destroying bacteria of different sizes or characteristics. Thus one screen may be vibrated at higher frequency — i.e. above 100 KC and up to several megacycles — while another may be vibrated at lower frequencies - such as the range of 15 - 100 KC.

It will be understood that the purified water may be accepted from conduit 54 in a back-flush reservoir 56 for reuse for agricultural or industrial purposes or may be used in a household plumbing system. If desired, the water is sufficiently pure so that it may be safely discharged into streams or may be otherwise reused.

Chamber 53 performs an auxiliary function. Thus, vapor collected in dome 28 may be conducted by pipe 76 to coil 77 within chamber 53 where the vapor is condensed and discharged through pipe 78 to pit 38 or to tank 56.

One of the features of the system is the fact that the discharge pressure of pump 39 is controlled so that the liquid entering through the discharge conduit 42 is of sufficient pressure to pass through screen 46, bed 47 and filter 52. The height to which the water must be pumped and the flow resistance of the filter material is counterbalanced by the pump 39, hence a substantially static system exists in filter 36 allowing solid components to settle out by gravity to a large extent andd thus relieving the filter system of the necessity of frequent cleaning.

The solid components collect at the bottom of hopper 37. Solid sensors 58a and 58b adjacent the top and bottom of the hopper sense the presence of solid material. When the level reaches sensor 58a, pump 63 is energized, causing solids to be forced from the bottom of the hopper 37 through valve 59 and thence out discharge pipe 61 to an outlet 62 which may be located in pipe 14. A preferred means for such discharge is for pump 54a to draw water from reservoir 56 and back-flush through sections 53, 31 and hopper 37, thence through pipe 42 into pump 39 and out through conduit 41. Thus the solid discharge may be forced back into receptacle 38. When the level of solids in hopper 37 diminishes to the level of sensor 58b, the pump 63 is de-energized and valve 59 closed.

Figure 6:
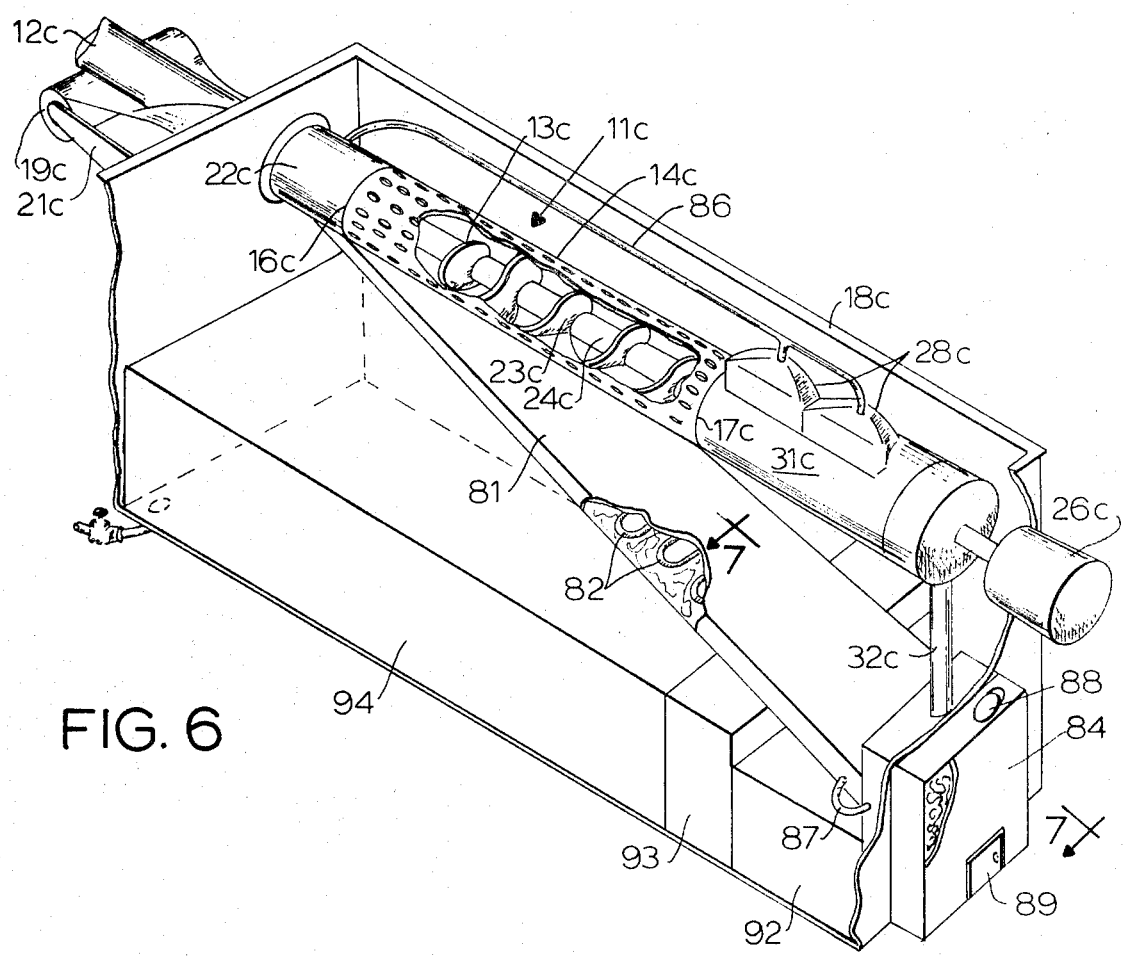
FIG. 6 is a view similar to FIG. 1 of a modification.
Figure 7:
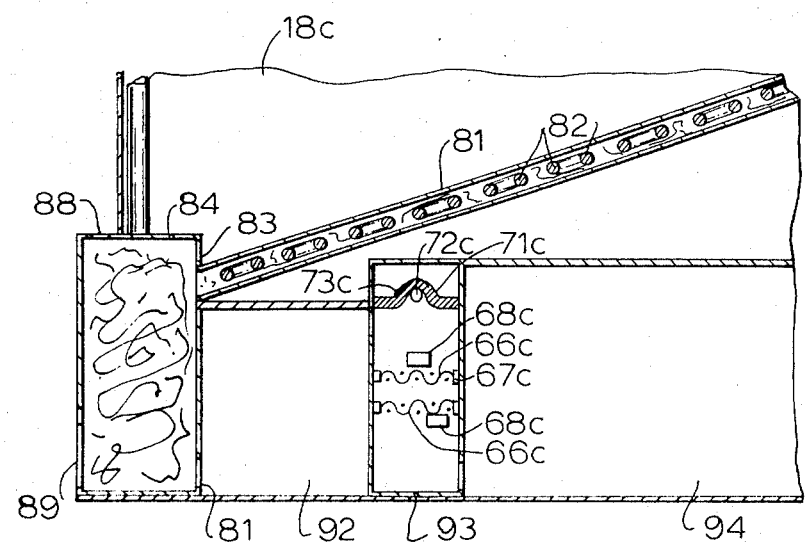
FIG. 7 is an enlarged, fragmentary sectional view taken substantially along line 7—7 of FIG. 6.

A modified construction is shown in FIGS. 6 and 7. Since in many respects elements of this modification are similar to those of the preceding, the same reference numerals, followed by subscript $c$ are used to designate corresponding parts.

Below primary filter 11c is a downward sloping, concave, hollow collector unit 81, the interior of which contains condenser coils 82. The liquid squeezed from the primary filter 11c falls on to the concave top of unit 81 and flows down through opening 83 into top of tank 84, which functions as a secondary filter.

The steam generated in dome 28c is conducted by pipe 86 into the upper end of coils 82 and the steam is condensed and flows from the bottom of coils 82 through pipe 87 into the top of tank 84. The ash from dehydrator unit 31c also drops through discharge conduit 32c into tank 84. Tank 84 contains activated charcoal and aggregate which is replenished through door 88 and the spent material is removed occasionally through door 89. Filtered liquid is discharged from tank 84 through opening 91 in the bottom and into holding tank 92. From the top of tank 92 the liquid flows down through tertiary filter unit 93 and thus into storage tank 94, from which it may be recirculated. In tertiary filter 93 may be micromesh screens 66c energized by ultrasonic vibrators 68c. Also a plug 71c containing radioactive material 72c properly shielded by lead material 73c and also having a trigger-actuated safety shield is installed to irradiate the liquid to destroy bacteria and viruses. Ultra-violet radiation, other radiant energizing sources and also chemicals and gases (e.g. ozone) may be used to treat the water. Water leaving unit 93 is free of solid contaminants and also bacteria and viruses.

It will thus be seen that the system hereinbefore described disposes of both solid and liquid components of waste in a manner so as not to contaminate the atmosphere and surrounding land and streams. Most of the solid material is treated in the primary filter unit 11, and the paper tube 22 and its contents are dehydrated or incinerated while the water filtered through the tube 22 and pipe 14 is collected and intermittently filtered and purified for re-use while the filtrate of the secondary filter is suitably handled.

I claim:

1. Apparatus for treatment of waste having solid and liquid components comprising holding means for holding a flat web of fibrous filter material, feeding means for feeding said web from said holding means and curling said web into a tubular shape with edges of said web overlapping, waste discharge means for depositing said waste inside said tubular shape, said waste discharge means comprising a pipe, said tubular shape being formed around said pipe, said tubular shape extending beyond the end of said pipe in a direction away from said holding means, expressing means for forcing said liquid components through said tubular shape while encapsulating said solid components inside said tubular shape, and solid disposal means for disposing of both said solid waste and the filter material encapsulating said solid waste.

2. Apparatus according to claim 1 in which said expressing means comprises a perforated conduit surrounding the terminus of said waste discharge means and a stretch of said tubular shape.

3. Apparatus according to claim 2 in which said expressing means further comprises means for expressing liquid out of said tubular shape by twisting said shape.

4. Apparatus according to claim 3 in which said last named means comprises a helical flight within said tubular means and within said perforated conduit.

5. Apparatus according to claim 1 in which said solid disposal means comprises a dehydrator into which said tubular shape and encapsulated solid waste are received.

6. Apparatus according to claim 1 which further comprises secondary filter means, means for forcing liquid components discharged from said first-mentioned filter means through said secondary filter means and a reservoir to collect liquid discharged from said secondary filter means.

7. Apparatus according to claim 6 in which said secondary filter means comprises a sump for collection of solids filtered by said secondary filter means and means for removing solids from said sump.

8. Apparatus according to claim 6 in which said secondary filter means comprises a bed of aggregate.

9. Apparatus according to claim 6 in which said secondary filter means comprises a screen-type filter.

10. Apparatus according to claim 6 which further comprises means between said secondary filter means and said reservoir for destroying bacteria in said liquid.

* * * * *